United States Patent
Sala et al.

(10) Patent No.: US 8,151,692 B2
(45) Date of Patent: Apr. 10, 2012

(54) APPARATUS FOR PREPARING BEVERAGES FROM SOLUBLE PREPARATIONS WITH AROMA-PRESERVING DEVICE

(75) Inventors: Dario Sala, Binasco Ml (IT); Claudio Bianchi, Binasco Ml (IT)

(73) Assignee: Gruppo Cimbali S.p.a., Binasco Mi (IT)

( * ) Notice: Subject to any disclaimer, the term of this patent is extended or adjusted under 35 U.S.C. 154(b) by 528 days.

(21) Appl. No.: 12/325,064

(22) Filed: Nov. 28, 2008

(65) Prior Publication Data

US 2009/0188395 A1 Jul. 30, 2009

(30) Foreign Application Priority Data

Jan. 30, 2008 (EP) .................................... 08425044

(51) Int. Cl.
*A47J 31/00* (2006.01)
(52) U.S. Cl. ........... 99/287; 99/289 R; 99/275; 99/323.3
(58) Field of Classification Search ................... 99/287, 99/275, 279, 286, 323.3; 222/129.1, 145.6, 222/129.3, 146.2; 88/289 R
See application file for complete search history.

(56) References Cited

U.S. PATENT DOCUMENTS

| 2,827,845 | A | * | 3/1958 | Richeson | .......................... 99/282 |
| 3,382,897 | A | | 5/1968 | Skiera et al. | |
| 4,172,669 | A | * | 10/1979 | Edelbach | .................... 366/181.1 |
| 5,511,465 | A | * | 4/1996 | Friedrich et al. | ................. 99/286 |
| 5,918,768 | A | * | 7/1999 | Ford | .............................. 222/113 |
| 5,975,357 | A | * | 11/1999 | Topar | .............................. 222/56 |

FOREIGN PATENT DOCUMENTS

| DE | 33 42 157 | 5/1985 |
| DE | 296 11 088 | 1/1997 |
| GB | 1 004 814 | 9/1965 |
| GB | 1 006 191 | 9/1965 |
| IT | VR2004A000124 | 7/2004 |

OTHER PUBLICATIONS

European Search Report for EP Application No. 08 42 5044, dated Oct. 6, 2008.

* cited by examiner

*Primary Examiner* — Reginald L Alexander
(74) *Attorney, Agent, or Firm* — Nixon & Vanderhye PC

(57) ABSTRACT

Apparatus for preparing a beverage using a soluble preparation, comprising a container for the soluble preparation, a mixer provided with a mixing chamber, said chamber having a filling inlet for the soluble preparation, at least one opening for supplying a liquid for solubilizing the preparation and forming the beverage, a duct for evacuating any vapour and/or aerosol which forms during preparation of the beverage, said duct comprising a suction fan, as well as an opening for dispensing the prepared beverage, a centrifuging device housed inside said mixing chamber and rotationally operated by an associated electric motor positioned outside said chamber, means for conveying a predetermined quantity of soluble preparation from the said container to the filling mouth of said mixing chamber, as well as means for conveying the solubilization liquid from the associated source to the respective opening of the mixing chamber.

The apparatus also includes a movable member for closing and opening the said filling inlet of the mixing chamber and means for displacing this member from a position where it keeps the filling inlet open during introduction of a quantity of soluble preparation and a position where it is over said inlet and keeps it closed during formation of the beverage and vice versa.

5 Claims, 3 Drawing Sheets

APPARATUS FOR PREPARING BEVERAGES FROM SOLUBLE PREPARATIONS WITH AROMA-PRESERVING DEVICE

This application claims priority to Europe Application No. 08425044.8, filed Jan. 30, 2008, the entire contents of which is hereby incorporated by reference.

BACKGROUND OF THE INVENTION

The present invention relates to an apparatus for preparing a beverage using a soluble preparation, comprising a container for the soluble preparation, a mixer provided with a mixing chamber, said chamber having a filling inlet for the soluble preparation, at least one opening for supplying a liquid for solubilizing the preparation and forming the beverage, a duct for evacuating any vapour and/or aerosol which forms during preparation of the beverage, said duct comprising a suction fan, as well as an opening for dispensing the prepared beverage, a centrifuging device housed inside said mixing chamber and rotationally operated by an associated electric motor positioned outside said chamber, means for conveying a predetermined quantity of soluble preparation from the said container to the filling inlet of said mixing chamber, as well as means for conveying the solubilization liquid from the associated source to the respective opening of the mixing chamber.

An apparatus of the type mentioned above is known from the art in the sector and is, for example, described in Italian patent application IT VR2004A000124, in GB patent No. 1,004,814 and in German published patent application No. DE 33 42 157.

As is known, during formation of the reconstituted beverage from soluble preparations, remixing of the quantity of preparation with the solubilization liquid which, in most cases, is water from a source at a suitable pressure and temperature, produces a certain evaporation of the water and the formation of aerosol.

The fine water spray and vapour produced by the centrifuging member pass out from the mixing chamber and, via the soluble-preparation filling inlet, permeate the container holding the preparation and the components for feeding the latter, greatly increasing the local moisture level.

The continuous alternation of vapour flows during dispensing and drying flows during the pauses in operation of the apparatus has the effect that part of the soluble preparation is transformed, firstly into a sticky mass, and then into a hard crust which prevents proper flowing of the preparation until blockage of the feeding means occurs, especially when these means are in the form of feeder screw or Archimedes' screw, as is conventionally used in the known art.

In order to overcome this drawback, the known art, as described in the cited published prior art documents, envisages the insertion of a fan inside the vapour evacuation duct and, in case of application IT VR2004A000124, also the operation of the fan by means of the same motor which causes rotation of the centrifuging member positioned inside the mixing chamber.

Although these known solutions allow aspiration of the vapour produced during formation of the beverage and conveying thereof far from the filling inlet of the mixing chamber, it nevertheless has the drawback that it operates during formation of the beverage when, inside the mixing chamber, the specific volatile aromatic and flavouring molecules of the beverage being prepared are also released and consequently removed from the beverage, adversely affecting the aroma and taste thereof.

The above mentioned drawback cannot be entirely eliminated even if the fan installed in the vapour evacuation duct is operated by means of a motor which is separate from that of the centrifuging member.

In these circumstances, in fact, the volatile molecules of the soluble preparation which are produced during reconstitution of the beverage, are dispersed not only along the vapour evacuation duct which communicates with the exterior of the apparatus, but also via the filling inlet of the mixing chamber.

The problem of avoiding a deterioration of the soluble product from which the beverage, such as coffee, milk, chocolate, tea and many other beverages, is reconstituted, and, at the same time, preserving the specific aroma of the reconstituted beverage, is particularly serious in the case of those soluble preparations which are specifically produced using processing techniques intended to preserve the characteristics of the aromatic molecules of the original primary foodstuff and a major drawback could arise from dispersion of these molecules owing to an apparatus which is not suitable for conservation thereof.

It is known that the perception of the quality of a food or a beverage presupposes that, during consumption thereof a quantity of volatile aromatic molecules in a concentration greater than the olfactory threshold is released, so that the nasal mucous is able to perceive them in the form of a perfume or aroma.

SUMMARY OF THE INVENTION

The object of the present invention is therefore to solve the problem indicated above with regard to the reconstitution of beverages from high-quality soluble preparations in such a way as to preserve their aroma.

A further object is to prevent the deterioration of the soluble preparation particularly inside their conveying means towards the mixing chamber.

BRIEF DESCRIPTION OF THE DRAWINGS

The invention will now be described more clearly with reference to some examples of embodiment thereof provided by way of a non-limiting example illustrated in the accompanying drawings in which.

DESCRIPTION OF THE PREFERRED EMBODIMENT

Figure 1:
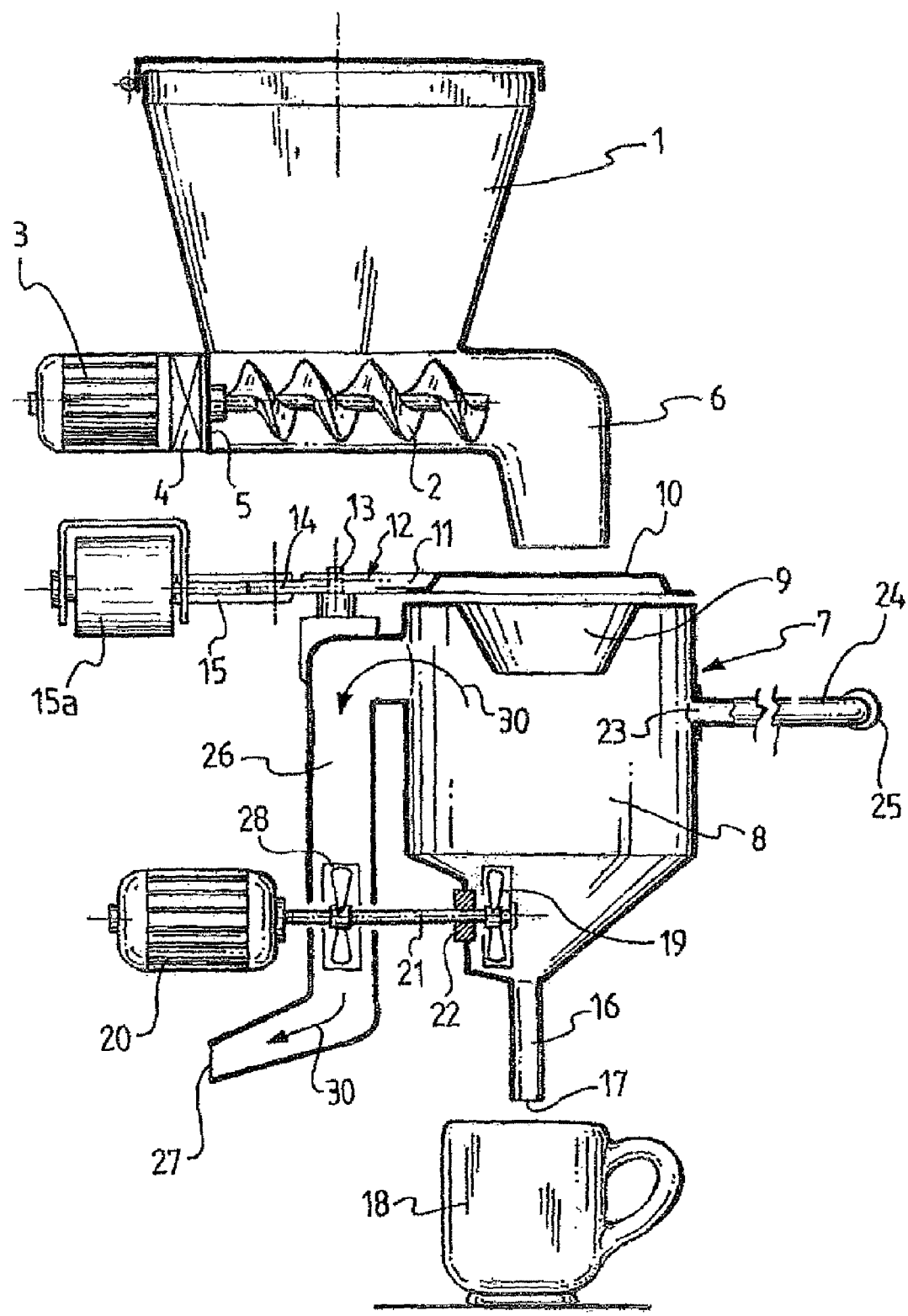
FIG. 1 shows a schematic vertical cross-section through the apparatus according to the invention, in accordance with a first embodiment thereof.

With reference to the abovementioned figures and in particular FIG. 1, the reference number 1 indicates a hopper suitable for forming the container for a soluble preparation which is used to reconstitute a beverage based, for example, on coffee, milk, chocolate or tea.

The bottom of the hopper 1 is occupied by a feeder screw 2, otherwise known as an "Archimedes' screw", which is rotationally operated by a motor 3 with an associated conventional gear reduction unit 4.

The feeder screw 2 operates between a closed shoulder 5 and a discharge duct 6 with an discharging opening from which a quantity of preparation is dispensed, the amount of said preparation depending on the dimensions of the feeder screw 2 and on the period of time for which it is kept rotating.

The duct 6 is positioned in vertical alignment with an underlying mixer, denoted overall by 7, and its discharging opening is located at a distance from a mixing chamber 8 which is provided with a filling inlet 9.

The latter, in the condition shown in FIG. 1, is closed by a disk-shaped member 10 fixed to the end 11 of a lever 12 which is able to pivot about a fulcrum 13, the latter being integral with the apparatus.

The opposite end 14 of the said lever 12 is engaged with an actuator 15 which, in the example shown, is the movable armature of an electromagnetic device 15, but which, as an alternative, may be the rod of a fluid-dynamic cylinder.

Again with reference to FIG. 1, it can be seen that the same mixing chamber 8 has a channel 16 for discharging the reconstituted beverage, said channel terminating in a dispensing opening 17 situated above a receiving cup 18.

The same mixing chamber 8 comprises a centrifuging device 19 operated by an electric motor 20 positioned outside the chamber 8.

The rotational movement of the centrifuging device 19 is transmitted by the shaft 21 which penetrates into the chamber 8 via a seal 22.

The mixing chamber 8 furthermore has an opening 23 having, leading thereto, a pipe 24 from a source 25 of solubilization liquid which may be water supplied under pressure and at the required temperature.

Alternatively, the source 25 may also supply both cold and heated milk.

Finally, the mixing chamber 8 has a duct 26 for evacuating the vapour and/or aerosol which forms inside the chamber 8 during preparation of the beverage by means of the centrifuging action exerted by the device 19 on the quantity of preparation and solubilization liquid introduced into the chamber 8.

A fan 28 is positioned inside the duct 26, the outlet of which is indicated by 27.

In accordance with the first embodiment of the apparatus, shown in FIG. 1, the fan 28 is rotationally operated by the same motor 20 which operates the centrifuging device 19 and is keyed onto the same shaft 21.

Figure 2:
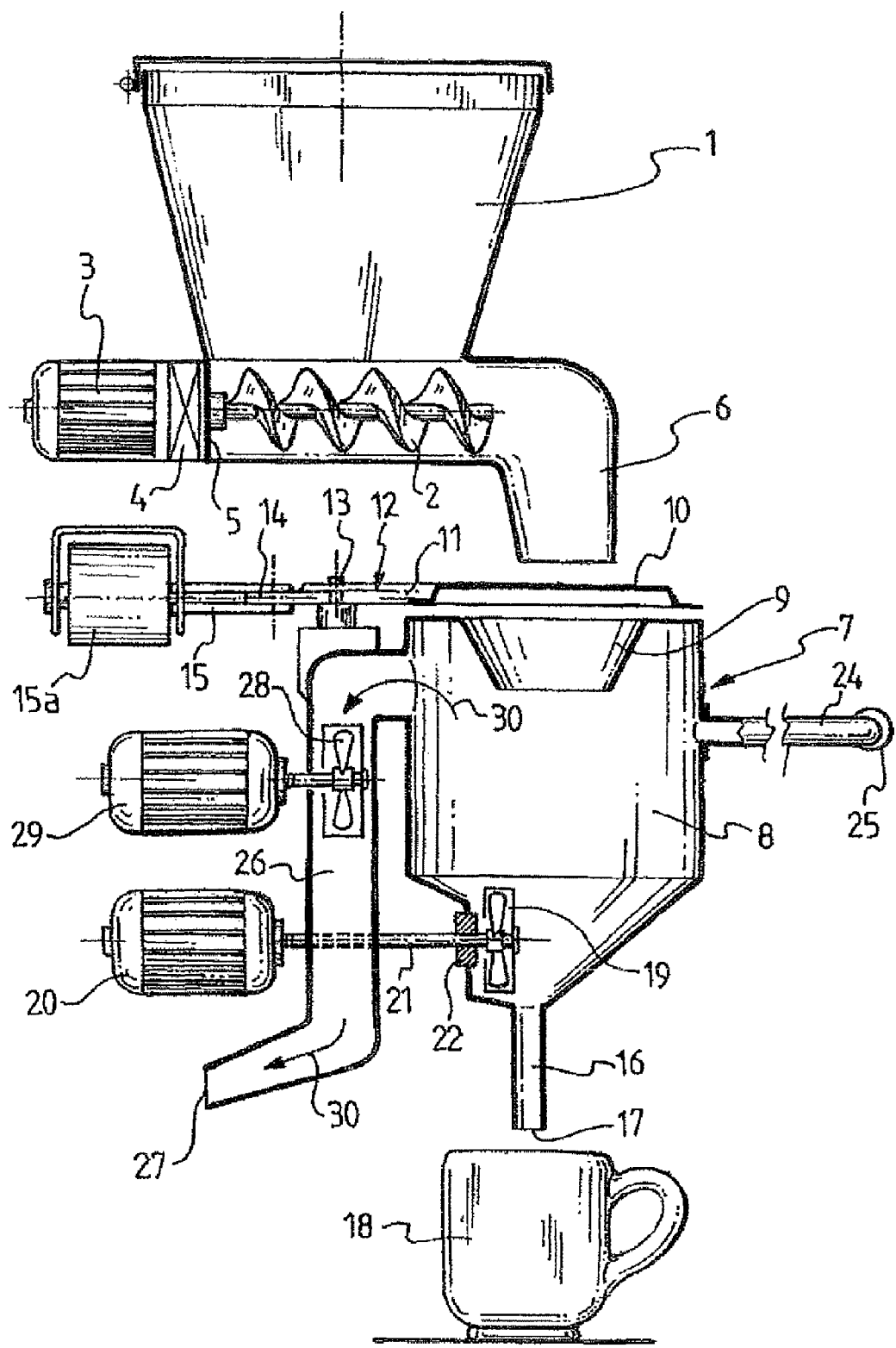
FIG. 2 shows a schematic vertical cross-section through the apparatus according to the invention, in accordance with a second embodiment thereof.

On the other hand, in accordance with the second embodiment of the apparatus shown in FIG. 2, the fan 28 is rotationally operated by an electric motor 29.

The evacuation path is indicated by the direction of the arrows 30 shown in FIGS. 1 and 2.

Figure 3:
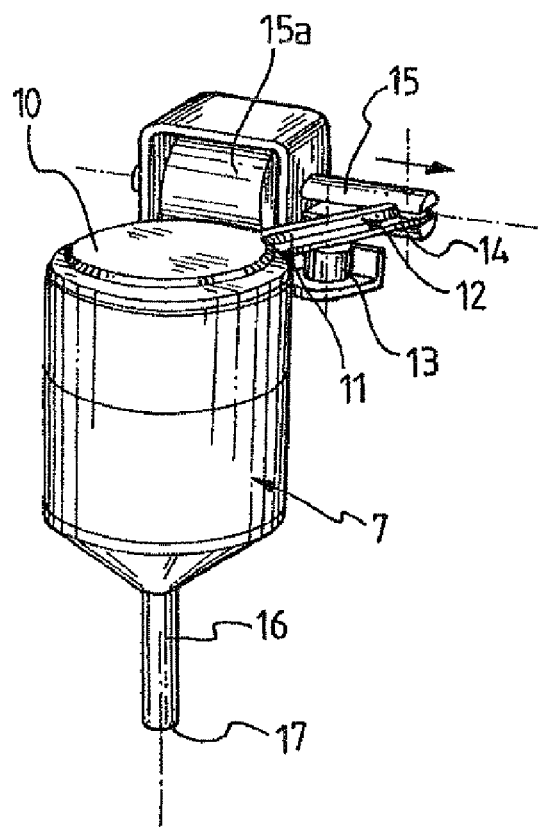
FIG. 3 shows a schematic perspective view of the mixing chamber of the apparatus according to the invention, in its closed condition.
Figure 4:
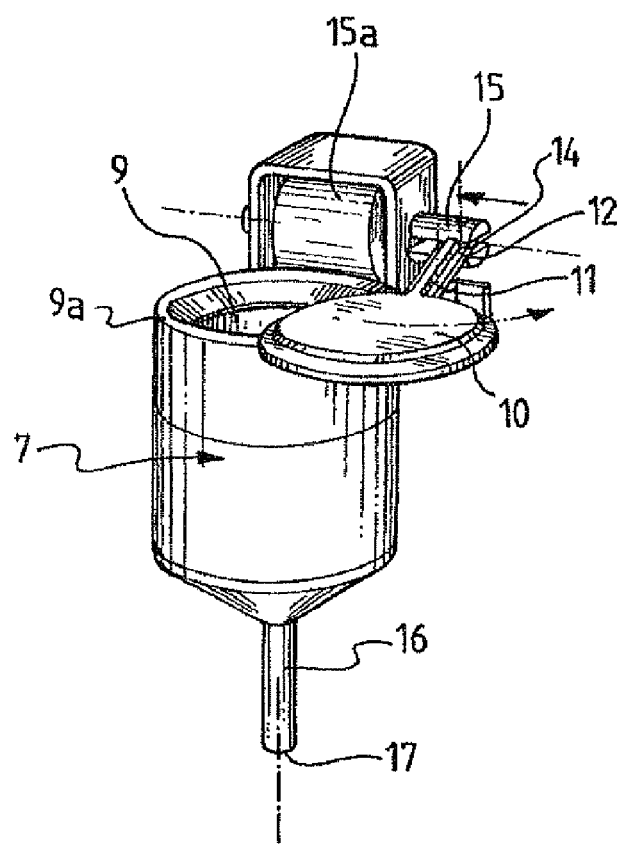
FIG. 4 shows a schematic perspective view of the mixing chamber of the apparatus according to the invention, in its open condition.

With reference now to FIGS. 3 and 4, it can be seen that the disk member 10 is displaceable between the position where it is arranged over the filling inlet 9 of the mixing chamber, closing it, and an angularly displaced position, which can be seen in particular in FIG. 4, where the filling inlet 9 is in the open condition.

The disk member 10 therefore moves parallel to the plane defined by the edge 9a of the filling inlet 9 in the zone situated over the said filling inlet 9 and underneath the discharging opening of the duct 6 from where the quantity of soluble preparation to be treated inside the mixing chamber 8 is dispensed.

From that described above, it can be understand that with the apparatus according to the invention it is possible to preserve the aroma of the preparation introduced inside the mixing chamber 8 and at the same time perform evacuation of the vapour and any aerosol produced by the solubilization liquid introduced into the chamber 8 for reconstitution of the beverage with also the additional result of preventing the deterioration of the soluble preparations.

In fact, with the apparatus according to the invention, after a quantity of soluble preparation has been introduced into the chamber 8, falling by means of gravity from the duct 6 into the filling inlet 9, and a corresponding quantity of solubilization liquid has been dispensed from the source 25, the mixing chamber 8 is closed by positioning the disk member 10 over the inlet 9.

The displacement of the disk member 10 is performed by means of a suitable command sent to the actuator 15 which actuates the lever 12.

At this point the centrifuging device 19 is activated and starts to form the beverage.

Although, during this operation, the vapour and the aerosol, produced depending on the temperature of the solubilization liquid, are drawn off, the aromatic molecules, which are typical of the aroma of the beverage being prepared, are not dispersed and remain inside the chamber 8 in contact with the beverage being formed.

Once preparation of the beverage and evacuation of the vapour and any aerosol has terminated, the filling inlet 9 may again be opened by means of the angular displacement of the disk member 10 and a new quantity of preparation may be introduced in the mixing chamber for repetition of the beverage formation process.

The operating commands are generated and managed by a control unit, not shown in that of a conventional nature.

The dimensions as well as the materials may be of any nature according to requirements without thereby departing from the scope of the invention as described above and claimed below.

What is claimed is:

1. An apparatus for preparing a beverage using a soluble preparation, comprising
   a container for the soluble preparation,
   a mixer provided with a mixing chamber, said chamber having a filling inlet for receiving the soluble preparation from the container, said filling inlet being provided with an edge lying in a plane,
   at least one opening in the mixing chamber for supplying a solubilization liquid for solubilizing the preparation and forming the beverage,
   a duct connected to the mixing chamber for evacuating any vapor and/or aerosol which forms in the mixing chamber during preparation of the beverage, said duct comprising a suction fan,
   an opening in the mixing chamber for dispensing the prepared beverage,
   a centrifuging device housed inside said mixing chamber and rotationally operated by an associated electric motor positioned outside said chamber,
   means for conveying a predetermined quantity of soluble preparation from the said container to the filling inlet of said mixing chamber, said means comprising a second duct positioned in vertical alignment with the underlying mixer,
   a discharging opening on said second duct located over said filling inlet of the mixing chamber and at a distance from the same,
   means for conveying the solubilization liquid from an associated source to the respective opening of the mixing chamber,
   a movable member for closing and opening said filling inlet of the mixing chamber, said movable member comprising a disk displaceable parallel to the plane of the filling inlet edge and means for displacing said movable member from a position where it keeps the filling inlet open during introduction of a quantity of soluble preparation and a position, located between said discharging opening and said filling inlet, where it is over said inlet and keeps it closed during formation of the beverage and vice versa, said means for displacing said movable member comprising a lever pivoting about a fulcrum integral with the apparatus, said lever being connected, at one of its ends, to said disk and, at its opposite end, to an actuator.

2. An apparatus according to claim 1, wherein said actuator is an electromagnetic device.

3. An apparatus according to claim 1, wherein said actuator is a fluid-dynamic device.

4. An apparatus according to claim 1, wherein said suction fan is rotationally operated by means of a dedicated electric motor.

5. An apparatus according to claim 1, wherein said suction fan is rotationally operated by means of the said electric motor actuating the said centrifuging device.

* * * * *